2,965,613
COPOLYESTERS

Charles R. Milone, Chillicothe, Marcia C. Shaffer, Akron, and Frederick S. Leutner, Cleveland Heights, Ohio, assignors to The Goodyear Tire & Rubber Company, Akron, Ohio, a corporation of Ohio No Drawing. Filed Mar. 2, 1954, Ser. No. 413,722

25 Claims. (Cl. 260—75)

This invention relates to new aromatic copolyesters and to products formed therefrom.

Ethylene glycol and esters of isophthalic acids can be reacted together to form polyesters. This polymerization reaction generally proceeds rather slowly and is accompanied by a side reaction that makes it difficult to carry out. The side reaction here that is particularly bothersome from a technical standpoint, especially when working in large batches, is the formation of a cyclic dimer which sublimes from the reaction mixture and solidifies in the cooler parts of the reactor and in the condensers. This hinders removal of glycol formed in the condensation reaction, makes it difficult to regulate the pressure in the system, and frequently necessitates shutting down operations to clean up equipment. In the published literature it is reported that polymeric ethylene isophthalate does not crystallize. We have found that it does not crystallize readily and, in fact, is extremely difficult to crystallize. For example, polymeric ethylene isophthalate, as taken from the melt polymerization apparatus and allowed to cool slowly, is transparent and X-ray diagrams indicate it to be completely amorphous. Some crystallization can be induced by heating the polymer for a long time at a temperature above its minimum crystallization temperature and below its melting point (as determined by the disappearance of birefringence on the hot stage microscope). Thus, a sample of ethylene isophthalate polymer heated for 40 days at 125° C. became opaque and showed a crystalline X-ray pattern. However, there was no significant change in density of the sample, which usually accompanies the change from amorphous to crystalline state, which suggests that the percentage of the polymer that crystallized was small.

Ethylene glycol and terephthalic acid, when reacted together, form polymers which, when of sufficiently high molecular weight, have high melting points, are readily crystallizable and form fibers of good physical properties. These polymers, in addition to being fiber-forming, can be extruded into films, but the production of extruded products, and particularly the production of films, is difficult because of the narrow softening range which these polymers have and because of the great rapidity with which they crystallize. High molecular weight polyethylene terephthalate films do not readily heat seal and do not lend themselves to solvent sealing because polyethylene terephthalate is extremely insoluble in low and moderately high boiling solvents. These properties limit the utility of these polyethylene terephthalate polymers.

Attempts have been made to overcome the above-noted objectionable properties of ethylene terephthalate polymers by making copolyesters of ethylene glycol, terephthalic acid and adipic acid, or ethylene glycol, terephthalic acid and sebacic acid. Some modification of the properties of the original polymers was obtained. For example a copolyester of ethylene glycol, terephthalic acid and adipic acid in which the terephthalic acid and adipic acid were contained in the proper proportions had certain properties which were advantageous and made these materials useful in applications in which the homopolymers of terephthalic acid with glycol or adipic acid with glycol could not be used. By forming such copolyesters, products were obtained which would form solutions in certain organic solvents. From these solutions films were cast by depositing a thin layer of solution on a smooth surface and evaporating the solvent. The physical properties of these films were within the range of the properties of a good plasticized vinyl film, but they did not possess the high strength and toughness that is characteristic of polyethylene terephthalate films. Thus, while it was shown that the copolyesters produced from these materials were different from the homopolymers and had some useful properties, it was also shown that these copolyesters lacked some of the most valuable properties of the ethylene terephthalate homopolymer.

According to the present invention a new type of copolyester has been discovered. These new copolyesters possess the most desirable properties of the polyethylene terephthalate homopolymer and also have additional valuable properties, such as a broader softening point range, reduced tendency to crystallize, and improved solubility in certain organic solvents. These copolyesters can be obtained by reacting together ethylene glycol, terephthalic acid and isophthalic acid or by reacting ethylene glycol with ester-forming derivatives of terephthalic and isophthalic acids, such as the lower alkyl esters and other recognized varieties. The ratio of terephthalic acid radicals to isophthalic acid radicals in the reacting mixture can be from 90/10 to 15/85. Thus the copolyesters can contain ethylene terephthalate units in amount of from 90 to 15 percent of the sum of the ethylene terephthalate and ethylene isophthalate units and, correspondingly, from 10 to 85 percent of said sum of ethylene isophthalate units.

The products of this invention can be prepared by the same general techniques as are employed in the preparation of other polymeric linear polyesters. They can be conveniently made, and are preferably made, by the ester interchange method in which the glycol is heated with lower alkyl esters of terephthalic and isophthalic acids such as the dimethyl esters, preferably in the presence of a suitable catalyst, and the alcohol released is distilled out of the reaction mixture, thereby forming the corresponding glycol phthalates. The glycol phthalates are then polymerized to proper molecular weight by further heating under vacuum. The products are composed of linear molecules of high average molecular weight in which the two kinds of repeating units, ethylene terephthalate.

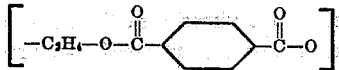

and ethylene isophthalate

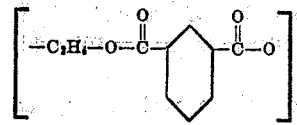

are distributed at random along the polymer chain. This random arrangement is in contradistinction to the arrangement of ordered linear copolyesters as set forth in British Patent 673,066. It is thought that some of the advantageous properties of the copolymer are produced in these products by the physical effects of this random arrangement and that the ability to produce some copolymers which are readily crystallizable and others that form clear, difficultly crystallizable products by proper selection of terephthalate-isophthlate ratios is due in part to the physical effects of this random arrangement of the various polymer units. Thus it is possible to control the rate and extent of crystallization by proper selection of terephthalate-isophthalate ratio.

The following example illustrates the preparation of a typical copolyester of the invention, the ethylene terephthalate-ethylene isophthalate radical ratio of this particular example being 75:25.

EXAMPLE 1

Six hundred seventy-five grams of dimethyl terephthalate, 225 grams of dimethyl isophthalate, 900 grams of ethylene glycol and 0.81 gram of litharge were placed in a three liter, three neck flask equipped with a stirrer, a nitrogen inlet tube extending into the liquid and a distillation column leading through a condenser to a one liter receiver. Oxygen-free nitrogen gas was slowly bubbled through the mixture. Heating was started and, when the mixture was molten, agitation was begun. Methanol began to distill over at a pot temperature of 140° C. The pot temperature was slowly raised and in 3.5 hours all of the methanol had distilled over and the pot temperature had reached 240° C. The pressure was then reduced to 10 millimeters of mercury and maintained there until most of the excess glycol had distilled out. The vacuum was released and the material was then transferred to a stainless steel melt reactor which was preheated to 220° C. and the condensation reaction was carried out in a nitrogen atmosphere at a pressure of 1.0 millimeter of mercury and a temperature of 270° C. for 9 hours, at the end of which time the polymer had an intrinsic viscosity of 0.773.

The term intrinsic viscosity, represented by the symbol $[\eta]$, is used herein as a measure of the degree of polymerization of the copolyester. It is defined by the Billmeyer equation as follows:

$$[\eta] = \tfrac{1}{4}\frac{\ln \eta_r}{C} + \tfrac{1}{4}\frac{\eta_{sp}}{C}$$

wherein $\eta_r$ is the viscosity of the dilute 60/40 phenol/tetrachloroethane mixed solvent solution of the copolyester divided by the viscosity of the 60/40 phenol/tetrachloroethane mixed solvent itself measured under the same conditions as the copolyester solution; $\eta_{sp} = \eta_r - 1$, where $\eta_r$ is as defined above; and C is the concentration of the copolyester in grams per 100 cubic centimeters of solution.

Polymers containing various ethylene terephthalate-ethylene isophthalate ratios were prepared. The time required to carry the copolymer to an intrinsic viscosity of 0.700 to 0.800 was determined. The times for formation of the various copolyesters is shown in the following table.

Table I

| Ratio, Dimethyl terephthalate: Dimethyl isophthalate | Percent Catalyst | Polymerization Temperature, °C. | Reaction Time in Hours |
| --- | --- | --- | --- |
| 85:15 | .033 | 268 | 11-12 |
| 75:25 | .033 | 258 | 12-14 |
| 60:40 | .033 | 268 | 18-20 |
| 35:65 | .06-.09 | 258 | 20-22 |
| 15:85 | .06-.09 | 258 | 20-22 |

The copolyesters of Table I were prepared by the procedure of Example 1. The ratio of dimethyl terephthalate to dimethyl isophthalate was varied to provide copolyesters of various compositions. It is seen from the data of this table that the effect of increasing the proportion of isophthalate in the reaction mixture is to slow up the rate of polymerization of the glycol phthalates formed from the reaction of the dimethyl esters with ethylene glycol. When the proportion of dimethyl isophthalate was 65 percent or higher the percentage of the catalyst used to effect polymerization had to be increased to 0.06 to 0.09 percent to obtain products of proper viscosity in a reasonable time. The percent catalyst in the above table is based on the total weight of the dimethyl terephthalate and the dimethyl isophthalate in the reacting mixture.

These copolyester resins have good molding properties. Test pieces were injection molded in a small Watson-Stillman press. The physical properties of the test pieces were determined and are tabulated below.

Table II
PHYSICAL PROPERTIES OF MOLDED ETHYLENE TEREPHTHALATE/ETHYLENE ISOPHTHALATE RANDOM COPOLYESTERS

| Test | Ethylene terephthalate/Ethylene isophthalate ratio in the Copolyester | | | | ASTM[1] Test Method |
| --- | --- | --- | --- | --- | --- |
| | 85/15 | 75/25 | 60/40 | 35/65 | |
| Ultimate Tensile Strength in Pounds per Square Inch | 7,000-5,350 | 9,500-8,700 | 9,000-8,000 | 8,500-7,500 | D638-49T |
| Ultimate Elongation in Percent | 2.5-4.0 | 3.6-5.2 | 4.1-5.3 | 2.5-4.1 | D638-49T |
| Izod Impact in Pounds | 7.3-6.0 | 7.1-6.2 | 6.5-6.0 | 8.2-7.0 | D256-47T |
| Water absorption in Percent | 0.38 | 0.35 | 0.42 | 0.26 | D570-42 |
| Dielectric Strength in Volts per Mil at 25° C. and 55% Relative Humidity; 60 Cycles | 600-538 | 700-681 | 670-588 | 600-551 | D149-44 |

[1] Test methods used are methods adopted by the American Society for Testing Materials, June 1950.

The copolyesters of this invention are particularly valuable as film forming materials. Films formed from these copolyesters have high tensile strength and low elongation and are dimensionally stable at 71° C. over the entire range of proportions. Films were prepared by molding samples of the various copolyesters into sheets 0.008 inch thick and immediately after molding quenching in ice water and then warming and stretching in two directions at right angles to each other at the lowest temperature at which the films could be stretched to increase the tensile strength of the copolyester films. The physical properties of film of various of the copolyesters are listed in Table III below.

Table III
PHYSICAL PROPERTIES OF TWO-WAY STRETCHED ETHYLENE TEREPHTHALATE/ ETHYLENE ISOPHTHALATE COPOLYESTER FILMS

| | Ethylene terephthalate/Ethylene isophthalate Ratio in the Copolyester | | | | | | | | |
| --- | --- | --- | --- | --- | --- | --- | --- | --- | --- |
| | 0/100 | 10/90 | 20/80 | 30/70 | 40/60 | 50/50 | 60/40 | 70/30 | 80/20 |
| Ultimate Tensile Strength (Pounds Per Square Inch) | 17,000 | 21,000 | 17,800 | 18,000 | 18,100 | 20,000 | 21,000 | 19,000 | 19,500 |
| Ultimate Elongation (Percent) | 150 | 90 | 140 | 120 | 110 | 90 | 120 | 80 | 90 |

The above data illustrate the effect of stretching the copolyester films in two directions and show that the tensile strength of those copolyesters that show little evidence of crystalline structure as determined by X-ray studies can be increased in the same manner and to about the same degree as the highly crystalline copolyester films.

For some uses it is desirable to stretch the film in only one direction, as for example in the preparation of tapes for industrial applications. Stretching in one direction is readily accomplished by such methods as winding a film from one roller to another, the second roller rotating at a higher peripheral speed than the first roller, or by using a snubbing pin on the first roller to slow its speed of rotation. This stretching operation may be accomplished by methods familiar to those skilled in the art and is facilitated by warming the film or tape by some suitable means just prior to the actual stretching of the film.

The random copolyesters of the invention provide a series of polymers of varying properties. The products containing from 90 to 75 percent of ethylene terephthalate are readily crystallizable materials that form films with good physical properties. These films have high tensile strength and the copolyesters differ from polyethylene terephthalate in that they have lower melting points, broader softening ranges and reduced crystallization rates, which properties make the production of films and other products by extrusion or molding much easier because they permit greater tolerances in temperature variations in extrusion or molding apparatus and allow longer working times for such operations as quenching so that it is much easier to make clear, transparent articles from these materials than it is from polyethylene terephthalate. These copolyesters, when crystallized, form crystallites that are small in size in comparison to the crystallites formed in the crystallization of polyethylene terephthalate. Crystalline materials are usually tough, abrasion resistance substances and it is generally recognized that the smaller the crystallites in a crystalline material, the tougher and more resistant to abrasion it is.

In addition to these crystallizable copolyesters containing from 90 to 75 percent of ethylene terephthalate in which it is possible to adjust the properties such as softening point and crystallization rate by the proper control of the ethylene terephthalate-ethylene isophthalate composition of the copolyester, copolyesters containing from 75 to 15 percent of ethylene terephthalate can be made which do not readily crystallize but which are soluble materials having excellent physical properties and are capable of being made into films or coated onto articles from solution to provide a protective or insulating coating. The copolyesters containing from 60 to 25 percent of ethylene terephthalate are particularly valuable for molding operations because they do not ordinarily crystallize appreciably and because they form clear objects of brilliant lustre which have excellent physical properties.

Second order transition temperatures were determined for the various copolymers in amorphous state. Pure ethylene terephthalate and ethylene isophthalate were included in the test, for comparison. The results are tabulated below.

Table IV

| Terephthalate:Isophthalate Ratio | Second order Transition Temperature, ° C. |
| --- | --- |
| 100:0 | 74 |
| 90:10 | 71 |
| 80:20 | 68 |
| 70:30 | 64.5 |
| 60:40 | 61 |
| 50:50 | 58 |
| 40:60 | 56.5 |
| 30:70 | 56 |
| 20:80 | 54 |
| 10:90 | 53 |
| 0:100 | 52 |

The working temperatures of the various polymers are indicated by the softening points. These are tabulated below.

Table V

| Copolyester Composition, Ethylene terephthalate: Ethylene isophthalate Ratio | Cube in Mercury (Softening Point) ° C. |
| --- | --- |
| 100:0 | 258 |
| 85:15 | 221; 222–223 |
| 75:25 | 194–196; 198 |
| 50:50 | 129.5–130 |
| 30:70 | 130–130.5 |
| 15:85 | 116–117; 122 |
| 0:100 | 163–164 |

In general, of the copolymers of the invention, those having the larger proportion of isophthalate groups have the greater solubility. The most soluble of the copolymers contain 25 to 85% ethylene isophthalate, and these are the most useful for such applications as coatings and cast film. However, copolymers containing as little as 10% of isophthalate radical are considerably more soluble than is the homopolymer, ethylene terephthalate. Similarly the copolymer containing 15% ethylene terephthalate/85% ethylene isophthalate is more soluble in certain solvents than is pure ethylene isophthalate. This is shown in Table VI which gives data on solubility determinations which were made on representative copolymers.

Solubilities of the copolymers were determined by placing 0.5 gram of finely divided polymer sample in a test tube with 6 grams of solvent (7.7% solution), and stirring mechanically at room temperature. If, after about 15 minutes, the polymer appeared to be insoluble or only slightly soluble at room temperature, the temperature was raised to 100° C. or to the boiling point of the solvent, if lower than 100° C., and stirring was continued. Solutions which were prepared at elevated temperatures were cooled to room temperature to see if the polymers would remain in solution in these cases where heat had been required to dissolve the polymer. In this table, any polymer-solvent combination which was still soluble after standing at room temperature for 48 hours is called soluble.

The data are tabulated below:

Table VI

SOLUBILITY CHARACTERISTICS OF ETHYLENE TEREPHTHALATE:ETHYLENE ISOPHTHALATE COPOLYESTERS IN VARIOUS SOLVENTS

| Solvent | Ethylene terephthalate:Ethylene isophthalate Ratio in Copolymer | | | | | |
| --- | --- | --- | --- | --- | --- | --- |
| | 100:0 | 85:15 | 75:25 | 60:40 | 15:85 | 0:100 |
| Cyclohexanone: | | | | | | |
| RT | I | I | Sl S | P S | S | I |
| 100° C | I | P S | P S | S | S | S |
| Acetophenone: | | | | | | |
| RT | I | I | I | S | S | I |
| 100° C | I | S | S | S | S | S |
| Methyl benzoate: | | | | | | |
| RT | I | I | Sl S | S | S | I |
| 100° C | I | P S | P S | S | S | S |
| Tetrahydrofuran: | | | | | | |
| RT | I | I | Sl S | S | S | I |
| 66° C | I | Sl S | Sl S | S | S | Sl S |
| Chloroform: | | | | | | |
| RT | I | Sl S | S | S | S | S |
| 61° C | Sl S | P S | S | S | S | S |
| Ethylene Dichloride: | | | | | | |
| RT | I | I | Sl S | S | S | I |
| 83° C | Sl S | P S | S | S | S | S |
| Trichloroethane: | | | | | | |
| RT | I | I | S | S | S | S |
| 100° C | Sl S | S | S | S | S | S |
| Tetrachloroethane: | | | | | | |
| RT | I | S | S | S | S | S |
| 100° C | I | S | S | S | S | S |
| Nitroethane: | | | | | | |
| RT | I | I | I | I | S | I |
| 100° C | I | P S | P S | S | S | S |
| Thiophene: | | | | | | |
| RT | I | I | Sl S | S | S | P S |
| 84° C | Sl S | P S | P S | S | S | S |

In the above table abbreviations used are as follows: RT is used for room temperature, I, Sl S, P S and S are used for insoluble, slightly soluble, partly soluble, and soluble, respectively.

The film forming characteristics of the soluble copolymers using the film casting technique is illustrated by a test run using a 60:40 ethylene terephthalate:ethylene isophthalate copolymer. A thin layer of an 18% solution of the copolymer in ethylene dichloride was spread on a smooth glass plate using a doctor knife type of spreader. The film and plate were heated in an oven at 66° C. until all odor of solvent had disappeared. The film at this stage was sticky and readily adhered to itself. After heating at 80° C. for one hour the film stiffened and was no longer sticky. The tensile strength of either the soft film or the film hardened by the heating indicated above could be greatly increased by stretching the film. The physical properties of the film in its various physical states are listed in the table below.

Table VII

|  | Not hardened by heating | | Pre-hardened by heating | |
|---|---|---|---|---|
|  | Ultimate Tensile Strength (Pounds per square inch) | Ultimate Elongation, Percent | Ultimate Tensile Strength (Pounds per square inch) | Ultimate Elongation, Percent |
| Soft, unstretched | 1,730 | 2,200 | 8,110 | 15 |
| Unstretched—4 days old | 3,900 | 60 |  |  |
| Partially stretched | 5,500 | 25 |  |  |
| Stretched to 1/10 original thickness | 8,000 | 15 | 16,000 | 85 |
| Stretched to 1/20 original thickness | 10,400 | 10 | 18,000 | 50 |

Films can also be made by extrusion from copolyesters containing from 85:15 to 15:85 ethylene terephthalate:ethylene isophthalate radical ratio in the polymer molecules. Orientation or stretching is necessary to develop optimum properties for use in packaging applications and other uses where films and foils having high tensile strength are used. The films have high clarity and a brilliant lustre and are characterized by high tensile strength, low elongation, good age life and excellent dielectric strength.

It is seen by the data of the above tables that this invention provides a series of new and valuable materials. These new copolyesters are suitable for the production of films, tapes, fibers, coatings, solutions, and molded goods. They possess excellent electrical properties and high strength.

In the production of these copolyesters it has been found that when the percentage of isophthalate radicals in the acid radical mixture exceeds 85% considerable difficulty is encountered in operating the reactors because of the formation of the cyclic dimer. This dimer sublimes and clogs condensers and, as an impurity in the polymer, causes brittleness and lowers physical properties. In addition, there is a considerable loss of starting material through the formation of this compound which raises the final cost of the polymer, making the use of more than 85% isophthalate undesirable from an economic standpoint.

At the upper end of the range we prefer to use not more than 90% of terephthalate radicals in the acid radical mixture because using above this percentage causes the softening point range of the polymer to be narrowed and decreases the solubility of the polymer to a point where it is almost as insoluble as polyethylene terephthalate. In addition, these high ethylene terephthalate-containing polymers have high working temperatures and this is undesirable because working at high temperatures increases the amount of thermal degradation which the polymer will undergo in a given time.

The preparation of the polymers can be accomplished by starting with the glycol and a mixture of terephthalic and isophthalic acids, or the glycol and a mixture of esters of terephthalic and isophthalic acids, or by starting with the glycol and some other suitable ester-forming derivative of terephthalic and isophthalic acids.

In order to have good physical properties in films formed from the copolyesters it is necessary that the copolyesters have a high molecular weight, i.e. an intrinsic viscosity of at least 0.4 and preferably in the range of 0.5 to 0.7.

While certain representative embodiments and details have been shown for the purpose of illustrating the invention, it will be apparent to those skilled in this art that various changes and modifications may be made therein without departing from the spirit or scope of the invention.

We claim:

1. A random ethylene terephthalate-ethylene isophthalate copolyester in which the ethylene terephthalate units comprise from 90 to 15 percent of the sum of the ethylene terephthalate and ethylene isophthalate units in the copolyester.

2. A crystallizable random ethylene terephthalate-ethylene isophthalate copolyester in which the ethylene terephthalate units comprise from 90 to 75 percent of the sum of the ethylene terephthalate and ethylene isophthalate units in the copolyester, said copolyester having an intrinsic viscosity of at least 0.40.

3. An organic solvent soluble random ethylene terepthalate-ethylene isophthalate copolyester in which the ethylene terephthalate units comprise from 75 to 15 percent of the sum of the ethylene terephthalate and ethylene isophthalate units in the copolyester, said copolyester having an intrinsic viscosity of at least 0.40.

4. The process of preparing polymeric copolyesters which comprises condensing ethylene glycol with a mixture of ester-forming terephthalic acid and isophthalic acid compounds in which the terephthalic acid compound constitutes from 90 to 15 mol percent of the mixture and the balance is the isophthalic acid compound until the ester-forming compounds are converted to the corresponding glycol phthalates and copolymerizing the said glycol phthalates until the polymer formed has an intrinsic viscosity of at least 0.40.

5. A crystalline random ethylene terephthalate-ethylene isophthalate copolyester in which the ethylene terephthalate units comprise from 90 to 75 percent of the sum of the ethylene terephthalate and ethylene isophthalate units in the copolyester, said copolyester having an intrinsic viscosity of at least 0.40.

6. A tough flexible oriented film of a random ethylene terephthalate-ethylene isophthalate copolyester in which the ethylene terephthalate units comprise from 90 to 15 percent of the sum of the ethylene terephthalate and ethylene isophthalate units in the copolyester, said copolyester having an intrinsic viscosity of at least 0.40.

7. A tough flexible unidirectionally oriented film of a random ethylene terephthalate-ethylene isophthalate copolyester in which the ethylene terephthalate units comprise from 90 to 15 percent of the sum of the ethylene terephthalate and ethylene isophthalate units in the copolyester, said copolyester having an intrinsic viscosity of at least 0.40.

8. A tough flexible biaxially oriented film of a random ethylene terephthalate-ethylene isophthalate copolyester in which the ethylene terephthalate units comprise from 90 to 15 percent of the sum of the ethylene terephthalate and ethylene isophthalate units in the copolyester, said copolyester having an intrinsic viscosity of at least 0.40.

9. A transparent, tough, flexible, non-self-adherent unoriented film of a random ethylene terephthalate-ethylene isophthalate copolyester in which the ethylene terephthalate units comprise from 75 to 15 percent of the sum of the ethylene terephthalate and ethylene isophthalate units in the copolyester, said copolyester having an intrinsic viscosity of at least 0.40.

10. A solution comprising an organic solvent soluble random ethylene terephthalate-ethylene isophthalate copolyester, said copolyester containing from 90 to 15 percent of ethylene terephthalate units and from 10 to 85 percent of ethylene isophthalate units.

11. A molded random ethylene terephthalate-ethylene isophthalate copolyester in which the ethylene terephthalate units comprise from 90 to 15 percent of the sum of the ethylene terephthalate and ethylene isophthalate units in the copolyester.

12. An amorphous, unoriented film of a random ethylene terephthalate-ethylene isophthalate copolyester in which the ethylene terephthalate units comprise from 90 to 15 percent of the sum of the ethylene terephthalate and ethylene isophthalate units in the copolyester, said copolyester having an intrinsic viscosity of at least 0.40.

13. A solution in an organic solvent of a random ethylene terephthalate-ethylene isophthalate copolyester in which the ethylene terephthalate units comprise from 75 to 15 percent of the sum of the ethylene terephthalate and ethylene isophthalate units in the copolyester.

14. A coated article in which the coating is a random ethylene terephthalate-ethylene isophthalate copolyester in which the ethylene terephthalate units comprise from 75 to 15 percent of the sum of the ethylene terephthalate and ethylene isophthalate units.

15. A random ethylene terephthalate-ethylene isophthalate copolyester fiber in which the ethylene terephthalate units comprise from 90 to 15 percent of the sum of the ethylene terephthalate and ethylene isophthalate units in the copolyester.

16. A molded random ethylene terephthalate-ethylene isophthalate copolyester in which the ethylene terephthalate units comprise from 60 to 25 percent of the sum of the ethylene terephthalate and ethylene isophthalate units.

17. A random ethylene terephthalate-ethylene isophthalate copolyester in which ethylene terephthalate units comprise 80% of the sum of the ethylene terephthalate and ethylene isophthalate units in the copolyester, said copolyester having an intrinsic viscosity of at least 0.40.

18. A random ethylene terephthalate-ethylene isophthalate copolyester in which the ethylene terephthalate units comprise 90% to 70% of the sum of the ethylene terephthalate and ethylene isophthalate units in the copolyester, said copolyester having an intrinsic viscosity of at least 0.40.

19. The process which comprises reacting together under ester interchange conditions ethylene glycol, from 90% to 70% by weight, based on the total weight of dimethyl esters, of dimethyl terephthalate and from 10% to 30% by weight of dimethyl isophthalate whereby to form a mixed ester and thereafter polymerizing said mixed ester under polymerizing conditions to form a linear copolyester.

20. A random ethylene terephthalate-ethylene isophthalate copolyester in which the ethylene terephthalate units comprise 90% of the sum of the ethylene terephthalate and ethylene isophthalate units in the copolyester, said copolyester having an intrinsic viscosity of at least 0.40.

21. A random ethylene terephthalate-ethylene isophthalate copolyester in which the ethylene terephthalate units comprise 75% of the sum of the ethylene terephthalate and ethylene isophthalate units in the copolyester, said copolyester having an intrinsic viscosity of at least 0.40.

22. A random ethylene terephthalate-ethylene isophthalate copolyester in which the ethylene terephthalate units comprise 60% of the sum of the ethylene terephthalate and ethylene isophthalate units in the copolyester, said copolyester having an intrinsic viscosity of at least 0.40.

23. A film of a random ethylene terephthalate-ethylene isophthalate copolyester in which the ethylene terephthalate units comprise 60 percent of the sum of the ethylene terephthalate and ethylene isophthalate units in the copolyester, said copolyester having an intrinsic viscosity of at least 0.40.

24. An unoriented film of a random ethylene terephthalate-ethylene isophthalate copolyester in which the ethylene terephthalate units comprise 60 percent of the ethylene terephthalate and ethylene isophthalate units in the copolyester, said copolyester having an intrinsic viscosity of at least 0.40.

25. The process which comprises polymerizing a mixture of ethylene glycol terephthalate and ethylene glycol isophthalate in which the ethylene glycol terephthalate constitutes from 90 to 15 mol percent of the mixture and the balance is the ethylene glycol isophthalate until the copolyester formed has an intrinsic viscosity of at least 0.40.

References Cited in the file of this patent

UNITED STATES PATENTS 2,497,376   Swallow _____ Feb. 14, 1950

FOREIGN PATENTS 673,066   Great Britain _____ June 4, 1952

OTHER REFERENCES

Hill et al.: Journal Polymer Science, vol. 3, October 1948, pp. 609–630.